United States Patent
Tseng

(10) Patent No.: US 8,419,419 B1
(45) Date of Patent: Apr. 16, 2013

(54) LIGHT GUIDE PLATE MOLD

(75) Inventor: Shun-Chi Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/488,587

(22) Filed: Jun. 5, 2012

(30) Foreign Application Priority Data

Dec. 14, 2011 (TW) .................................. 100146207

(51) Int. Cl.
B29C 45/34 (2006.01)
(52) U.S. Cl.
USPC .......................................... 425/572; 425/812
(58) Field of Classification Search ................... 425/572, 425/812
See application file for complete search history.

(56) References Cited

U.S. PATENT DOCUMENTS

| | | | | |
|---|---|---|---|---|
| 3,377,662 A * | 4/1968 | Toshio Fukushima | ....... | 425/401 |
| 4,750,876 A * | 6/1988 | Lawson | ........................ | 425/406 |
| 7,802,983 B2 * | 9/2010 | Fischer et al. | ................. | 425/570 |
| 8,246,340 B2 * | 8/2012 | Chen | .............................. | 425/441 |
| 2002/0192323 A1 * | 12/2002 | Radzio et al. | ................. | 425/149 |

OTHER PUBLICATIONS

Franklin D. Yeaple, Hydraulic and Pneumatic Power and Control, 1966, Mcgraw-Hill, pp. 268-270.*

* cited by examiner

Primary Examiner — Tim Heitbrink
(74) Attorney, Agent, or Firm — Altis Law Group, Inc.

(57) ABSTRACT

A light guide plate mold includes a female mold, a male mold mounted on and cooperating with the female mold, and an adjusting assembly. The male mold includes a first mounting surface and an opposite second mounting surface. The first mounting surface defines two mold cavities and a flow slot communicating with the two mold cavities. The second mounting surface defines a plurality of mounting holes extending through the opposite first mounting surface. The adjusting assembly includes a plurality of adjusting members. The adjusting members are adjustably assembled into the mounting holes of the male mold, and resist against the female mold, thereby forming an exhaust passage adjustably configured between the male mold and the female mold. The exhaust passage is capable of being adjusted by operating the adjusting assembly.

15 Claims, 7 Drawing Sheets

LIGHT GUIDE PLATE MOLD

BACKGROUND

1. Technical Field

The present disclosure relates to molds and, particularly, to a light guide plate mold for manufacturing a light guide plate.

2. Description of Related Art

Light guide plates may be manufactured by an injection molding process. Since the light guide plates are always very thin, the mold cavity of the injection mold is designed to be very small in size. High-speed injection imposes large amount of forces on the injection mold, and the injection mold has a poor air exhausting efficiency.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
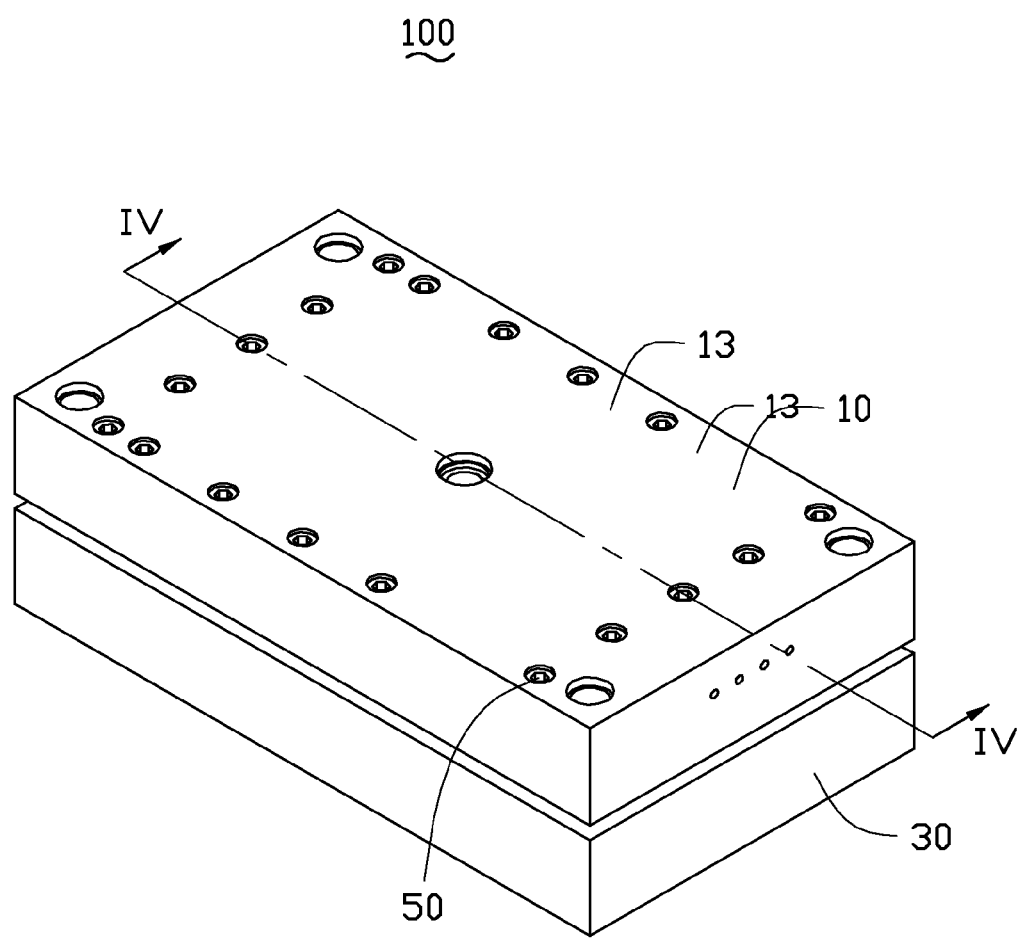
FIG. 1 shows an isometric view of an embodiment of a light guide plate mold.
Figure 2:
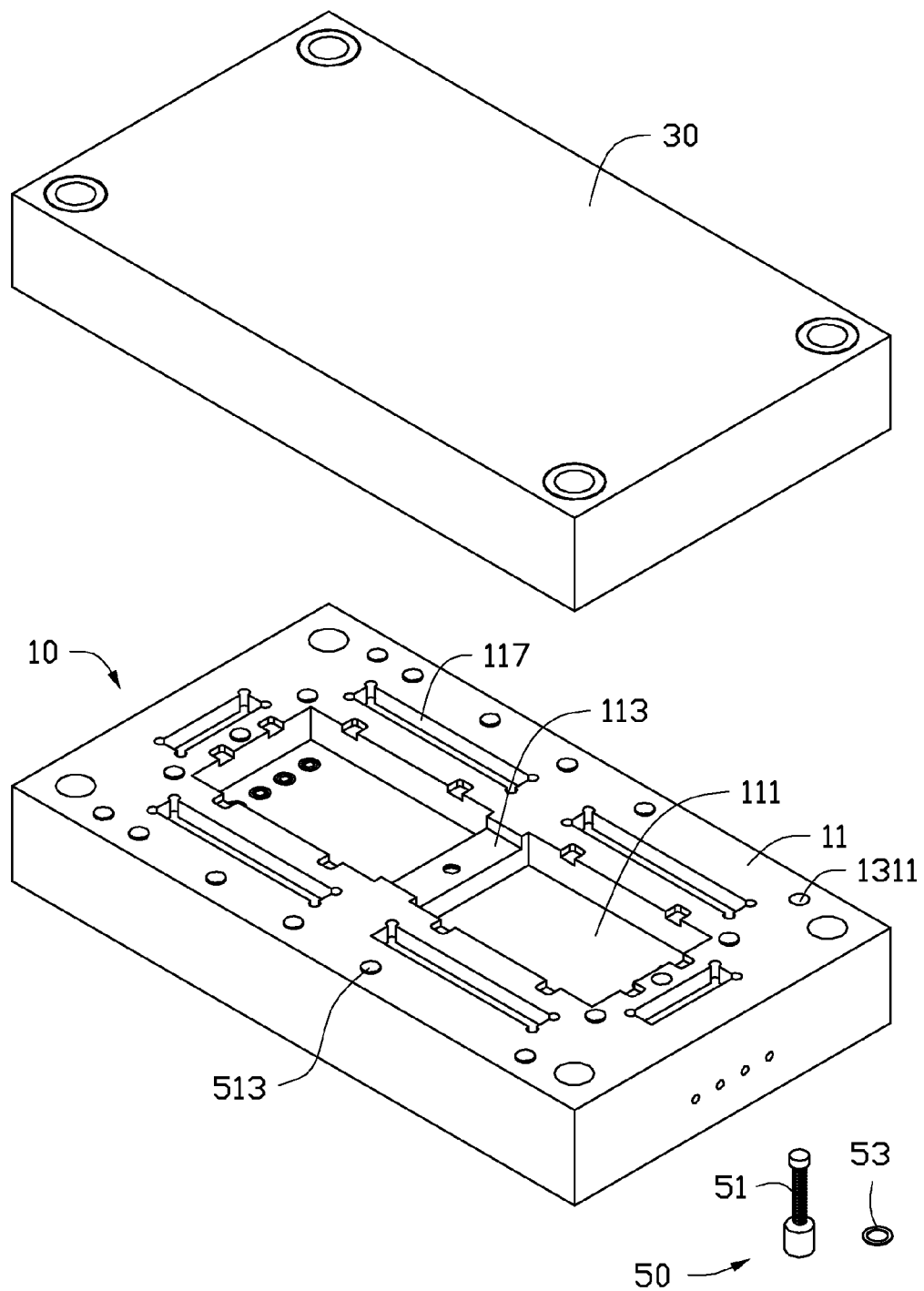
FIG. 2 shows an exploded view of the light guide plate mold of FIG. 1.
Figure 3:
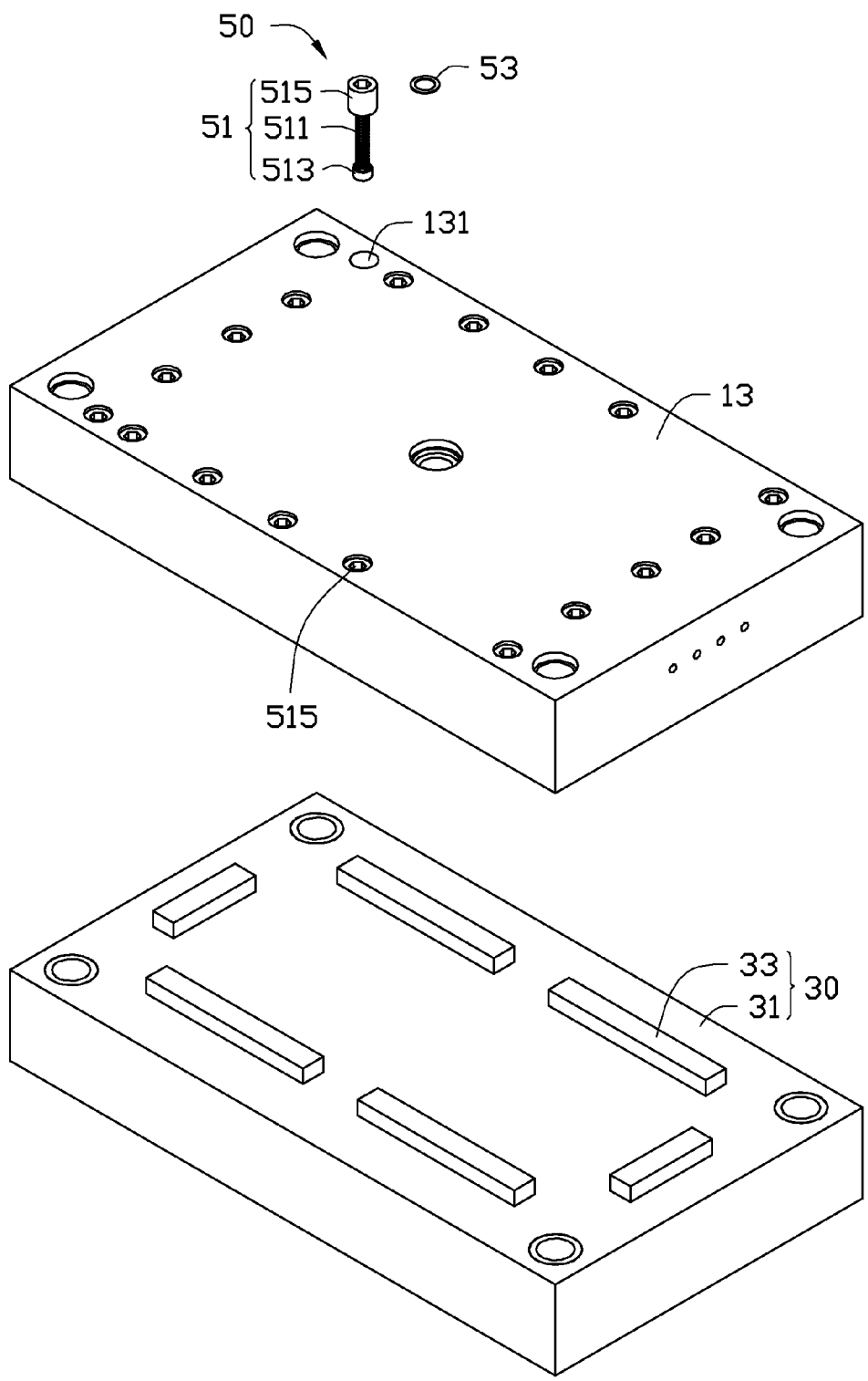
FIG. 3 is similar to FIG. 2, but viewed from another aspect.
Figure 4:
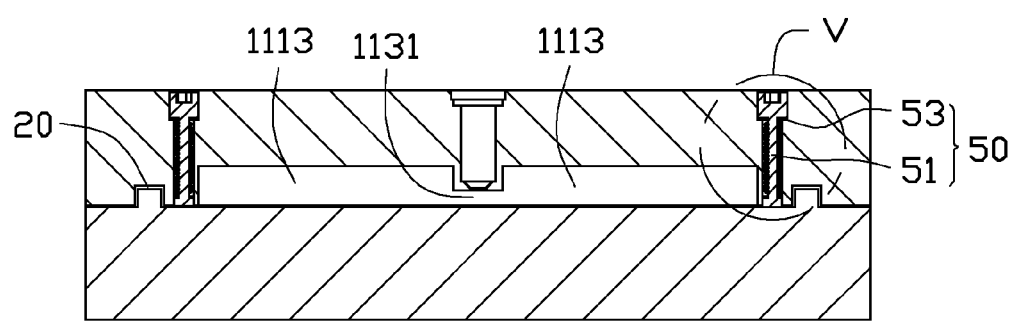
FIG. 4 shows a cross-sectional view taken along line IV-IV of the light guide plate mold of FIG. 1.
Figure 5:
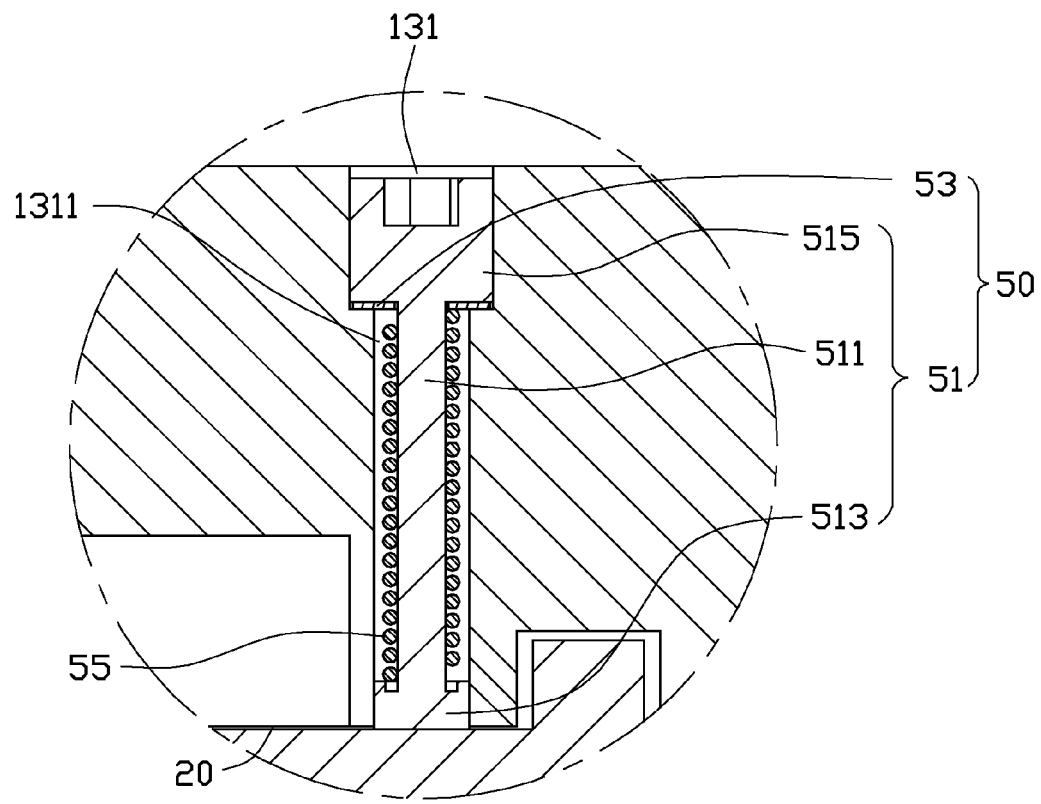
FIG. 5 shows an enlarged view of a circled portion V of FIG. 4.

Referring to FIG. 1, an embodiment of a light guide plate mold 100 includes a male mold 10, a female mold 30 cooperating with the male mold 10, and an adjusting assembly 50. The male mold 10 is mounted on the female mold 30. The adjusting assembly 50 is adjustably mounted to the male mold 10 and resists against the female mold 30, for adjusting a gap between the male mold 10 and the female mold 30. It is to be noted that, the light guide plate mold 100 may also includes other functional mechanisms (not shown) such as one or more fixing mechanisms, heating mechanisms, cooling mechanisms, ejecting mechanisms and the like.

Also referring to FIGS. 2 through 5, the male mold 10 includes a first mounting surface 11 and a second mounting surface 13 opposite to the first mounting surface 11. The first mounting surface 11 defines two mold cavities 111 and a flow slot 113 positioned between and communicating with the two mold cavities 111. In the illustrated embodiment, the two mold cavities 111 are symmetrically defined in the first mounting surface 11. The first mounting surface 11 further defines a plurality of matching slots 117 surrounding the two mold cavities 111, for facilitating the matching of the male mold 10 and the female mold 30 together. The second mounting surface 13 defines a plurality of mounting holes 131 configured along a periphery of the second mounting surface 13. The first mounting surface 11 defines a plurality of assembling holes 1311 coaxially communicating with the mounting holes 131.

The female mold 30 includes a main body 31, and a plurality of matching portions 33 formed on the main body 31, corresponding to the matching slots 117 of the male mold 10. In the illustrated embodiment, the main body 31 is substantially rectangular, and matches with the first mounting surface 11 of the male mold 10. The main body 31, the two mold cavities 111, and the flow slot 113 cooperatively define two forming chambers 1113 and a flow passage 1131 communicating with the two forming chambers 1113. The plurality of matching portions 33 engage with the matching slots 117 of the male mold 10, thereby assembling the male mold 10 and the female mold 30 together.

The adjusting assembly 50 includes a plurality of adjusting members 51, a plurality of washers 53 and a plurality of elastic members 55. The plurality of adjusting members 51 together with the plurality of washers 53 and the plurality of elastic members 55 are adjustably assembled into the mounting holes 131 of the male mold 10. The adjusting members 51 pass through the plurality of assembling holes 1311 and resist against the main body 31 of the female mold 30. An exhaust passage 20 is thus defined between the male mold 10 and the female mold 30, and communicating with the two forming chambers 1113 and the flow passage 1131. In the illustrated embodiment, each adjusting member 51 includes a connecting portion 511, a resisting portion 513 formed at a first end of the connecting portion 511, and a latching portion 515 formed at a second end of the connecting portion 511 opposite to the resisting portion 513. As the adjusting member 51 is assembled into one mounting hole 131 of the male mold 10, the elastic member 55 is sleeved on the connecting portion 511 of the adjusting member 51, with the two ends thereof resisting against the resisting portion 513 and against the latching portion 515 respectively. The resisting portion 513 of the adjusting member 51 passes through the mounting hole 131, the assembling hole 1311 and resists against the main body 31 of the female mold 30. The latching portion 515 is engaged into and latched within the mounting hole 131. The exhaust passage 20 configured between the male mold 10 and the female mold 30 is capable of being adjusted by operating the adjusting assembly 50, during usage. In one embodiment, a width of the exhaust passage 20 is preferred to be in a range from about 0.01 mm to about 0.05 mm.

The washer 53 is substantially circular and made of elastic material. The washer 53 is sleeved on the connecting portion 511 of the adjusting member 51, and is received within the mounting hole 131 together with the latching portion 515, for adjusting the width of the exhaust passage 20.

Figure 6:
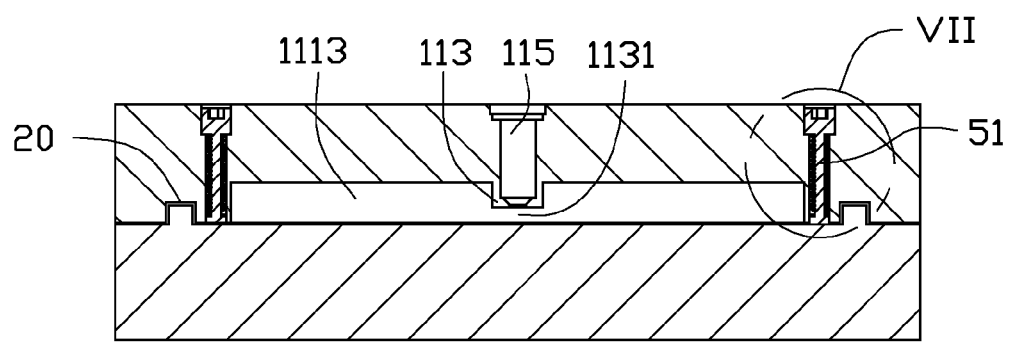
FIG. 6 is similar to FIG. 4 but without a washer.
Figure 7:
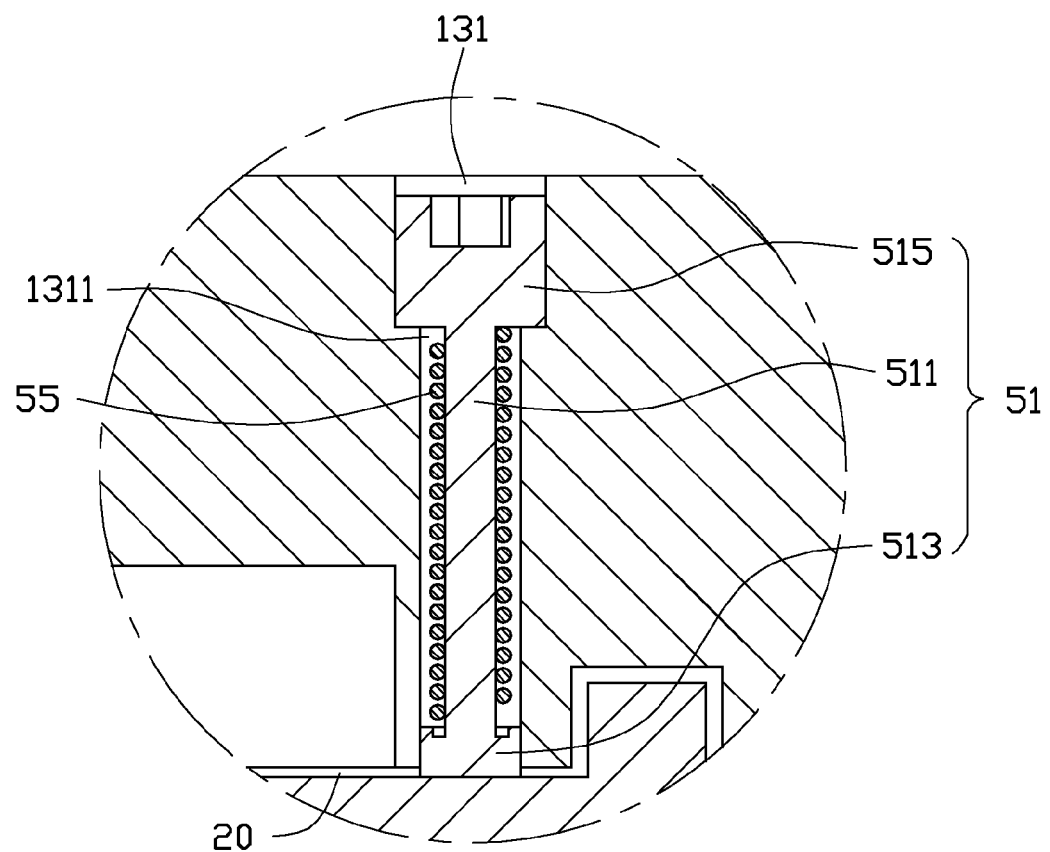
FIG. 7 shows an enlarged view of a circled portion VII of FIG. 6.

Also referring to FIGS. 6 and 7, when assembling the light guide plate mold 100, the plurality of adjusting members 51 are assembled into the mounting holes 131 of the male mold 10, with the latching portions 515 of the adjusting members 51 latched within the mounting holes 131, the resisting portions 513 passing through the assembling holes 1311 and exposed from the first mounting surface 11. The elastic members 55 are sleeved on the connecting portions 511 of the adjusting members 51, with the two ends thereof resisting against the corresponding latching portion 515 and against the resisting portion 513 respectively. The assembled male mold 10 is then mounted on the female mold 30, with the matching portions 33 engaging into the matching slots 117 of the male mold 10, and the resisting portions 513 resisting against the main body 31 of the female mold 30. The exhaust passage 20 is defined between the male mold 10 and the female mold 30. During usage, the width of the exhaust passage 20 can be adjusted by the washers 53 sleeved on the adjusting members 51.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A light guide plate mold comprising:
a female mold;
a male mold mounted on and cooperating with the female mold; and
an adjusting assembly adjustably mounted to the male mold and resisting against the female mold, an exhaust passage being formed between the male mold and the female mold by the adjusting assembly resisting against the female mold;
wherein a width of the exhaust passage is adjustable by operating the adjusting assembly.

2. The light guide plate mold of claim 1, wherein the male mold comprises a first mounting surface and a second mounting surface opposite to the first mounting surface, the first mounting surface defines at least one mold cavity, the second mounting surface defines a plurality of mounting holes, the adjusting assembly comprises a plurality of adjusting members, and the plurality of adjusting members are adjustably assembled into the corresponding mounting holes of the male mold, respectively, and resisted against the female mold.

3. The light guide plate mold of claim 2, wherein the exhaust passage communicates with the mold cavity.

4. The light guide plate mold of claim 1, wherein the width of the exhaust passage is in a range from about 0.01 mm to about 0.05 mm.

5. The light guide plate mold of claim 2, wherein the first mounting surface further defines a plurality of matching slots surrounding the mold cavity, the female mold comprises a main body and a plurality of matching portions formed on the main body, and the matching portions engage with the matching slots of the male mold, respectively, thereby assembling the male mold and the female mold together.

6. The light guide plate mold of claim 2, wherein each adjusting member comprises a connecting portion, a resisting portion formed at a first end of the connecting portion, and a latching portion formed at an opposite second end of the connecting portion; the adjusting assembly further comprises a plurality of elastic members, and the adjusting members are assembled into the corresponding mounting holes of the male mold, with the elastic members sleeved on the connecting portions of the adjusting members; and the resisting portions are exposed from the first mounting surface and resisted against the main body of the female mold.

7. The light guide plate mold of claim 6, wherein the adjusting assembly further comprises a plurality of washers, and the washers are sleeved on the connecting portions of the adjusting members, and are respectively received within the mounting holes together with the latching portions, for adjusting the width of the exhaust passage.

8. A light guide plate mold comprising:
a male mold comprising a first mounting surface and an opposite second mounting surface, the first mounting surface defining two mold cavities and a flow slot communicating with the two mold cavities, and the second mounting surface defining a plurality of mounting holes extending through the opposite first mounting surface;
a female mold mounted to and cooperating with the male mold; and
a plurality of adjusting members adjustably assembled into the mounting holes of the male mold, and resisting against the female mold, an exhaust passage being formed between the male mold and the female mold by the adjusting assembly resisting against the female mold;
wherein the exhaust passage communicates with the two mold cavities and a width of the exhaust passage is adjustable by operating the adjusting members.

9. The light guide plate mold of claim 8, wherein the width of the exhaust passage is in a range from about 0.01 mm to about 0.05 mm.

10. The light guide plate mold of claim 8, wherein the first mounting surface further defines a plurality of matching slots surrounding the mold cavity, the female mold comprises a main body and a plurality of matching portions formed on the main body, and the matching portions respectively engage with the matching slots of the male mold, thereby assembling the male mold and the female mold together.

11. The light guide plate mold of claim 10, wherein each adjusting member comprises a connecting portion, a resisting portion formed at a first end of the connecting portion, and a latching portion formed at an opposite second end of the connecting portion; the adjusting assembly further comprises a plurality of elastic members, and the adjusting members are assembled into the corresponding mounting holes of the male mold, with the elastic members sleeved on the connecting portions of the adjusting members; and the resisting portions are exposed from the first mounting surface and resisted against the main body of the female mold.

12. The light guide plate mold of claim 11, wherein the adjusting assembly further comprises a plurality of washers, and the washers are sleeved on the connecting portions of the adjusting members, and are respectively received within the mounting holes together with the latching portions, for adjusting the width of the exhaust passage.

13. The light guide plate mold of claim 1, wherein the adjusting assembly is structured and arranged to be operated manually to adjust the width of the exhaust passage.

14. The light guide plate mold of claim 1, wherein once the width of the exhaust passage is adjusted, the width of the exhaust passage remains constant until the width of the exhaust passage is adjusted again.

15. The light guide plate mold of claim 1, wherein the width of the exhaust passage is adjustable to a fixed value anywhere within the range from a minimum width of the exhaust passage to a maximum width of the exhaust passage.

* * * * *